United States Patent
Jones et al.

(10) Patent No.: US 7,370,326 B2
(45) Date of Patent: May 6, 2008

(54) PREREQUISITE-BASED SCHEDULER

(75) Inventors: Marc Timothy Jones, Costa Mesa, CA (US); Curtis Edward Nottberg, Costa Mesa, CA (US); Samuel Burk Siewert, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 520 days.

(21) Appl. No.: 10/817,290

(22) Filed: Apr. 2, 2004

(65) Prior Publication Data

US 2005/0240924 A1  Oct. 27, 2005

(51) Int. Cl.
*G06F 9/46* (2006.01)
*G06F 15/173* (2006.01)

(52) U.S. Cl. .................. 718/102; 718/104; 709/238

(58) Field of Classification Search ........... 718/102, 718/104; 709/238
See application file for complete search history.

(56) References Cited

U.S. PATENT DOCUMENTS

| | | | | |
|---|---|---|---|---|
| 5,155,854 A * | 10/1992 | Flynn et al. | ................ | 718/104 |
| 5,408,663 A * | 4/1995 | Miller | ........................ | 718/104 |
| 7,058,949 B1 * | 6/2006 | Willen et al. | ................ | 718/104 |
| 7,146,430 B2 * | 12/2006 | Kobayashi | ................... | 709/238 |
| 2004/0136434 A1 * | 7/2004 | Langley | ........................ | 374/29 |

* cited by examiner

*Primary Examiner*—Meng-Al T. An
*Assistant Examiner*—Camquy Truong
(74) *Attorney, Agent, or Firm*—Morrison & Foerster LLP

(57) ABSTRACT

A prerequisite-based scheduler is disclosed which takes into account system resource prerequisites for execution. Tasks are only scheduled when they can successfully run to completion and therefore a task, once dispatched, is guaranteed not to become blocked. In a prerequisite table, tasks are identified horizontally, and resources needed for the tasks are identified vertically. At the bottom of the table is the system state, which represents the current state of all resources in the system. If a Boolean AND operation is applied to the task prerequisite row and the system state, and if the result is the same as the prerequisite row, then the task is dispatchable. In one embodiment of the present invention, the prerequisite based scheduler (dispatcher) walks through the prerequisite table from top to bottom until a task is found whose prerequisites are satisfied by the system state. Once found, this task is dispatched.

40 Claims, 6 Drawing Sheets

|  | Port Queue | | SAS Cmd Queue | | SMP Cmd Queue | | Phy Queue | |
|---|---|---|---|---|---|---|---|---|
|  | !Full | !Empty | !Full | !Empty | !Full | !Empty | !Full | !Empty |
| Proto Router | 0 | 1 | 1 | 0 | 1 | 0 | 0 | 0 |
| SAS Handler | 0 | 0 | 0 | 1 | 0 | 0 | 1 | 0 |
| Phy Layer | 0 | 0 | 0 | 0 | 0 | 0 | 0 | 1 |
| SMP Handler | 0 | 0 | 0 | 0 | 0 | 1 | 1 | 0 |
| Idle Task | 0 | 0 | 0 | 0 | 0 | 0 | 0 | 0 |
| System State | 1 | 0 | 1 | 1 | 1 | 0 | 1 | 0 |
|  | Empty Queue | | Contains Message(s) | | Empty Queue | | Empty Queue | |

400

| Task | Prerequisites | Implied Priority | Block Priority |
|------|---------------|------------------|----------------|
| M    |               | 0                | 0              |
| G    |               | 1                | 0              |
| D    |               | 2                | 0              |
| A    |               | 3                | 0              |
| J    |               | 4                | 1              |
| F    |               | 5                | 1              |
| K    |               | 6                | 2              |
| H    |               | 7                | 2              |
| E    |               | 8                | 2              |
| B    |               | 9                | 2              |
| ...  |               | 10               |                |

*FIG. 6*

| Limit | Flags[0] | Flags[1] | Flags[2] | Flags[3] |
|-------|----------|----------|----------|----------|
| 0     | X        | O        | O        | O        |
| 2     | O        | X        | X        | O        |
| 1     | X        | X        | O        | O        |
| 3     | X        | O        | O        | X        |

*FIG. 7*

| | Buffer Pool | | Message Queue | | SLI-2 | Cmd TO |
|---|---|---|---|---|---|---|
| | !Full | !Empty | !Full | !Empty | On | Timed-Out |
| Task_0 | 0 | 1 | 0 | 0 | 0 | 0 |
| Task_1 | 0 | 0 | 0 | 1 | 0 | 0 |
| Task_TO | 0 | 0 | 0 | 0 | 1 | 1 |
| Idle | 0 | 0 | 0 | 0 | 0 | 0 |

PREREQUISITE-BASED SCHEDULER

BACKGROUND OF THE INVENTION

1. Field of the Invention

The present invention relates, generally, to the scheduling of tasks in non-trivial processing systems and, in one embodiment, to the prerequisite-based scheduling of tasks wherein scheduling decisions are made based on the priority of tasks and/or the presence or absence of resources needed for a particular task to execute.

2. Description of Related Art

Hardware context. In modern, non-trivial processing systems, the operating system creates a new task when a program is to be executed by a processor. Although many tasks may be created, only one task may have access to the processor at any one time. Schedulers are therefore required to identify the next task to dispatch from a list of potentially dispatchable tasks.

A host bus adapter (HBA) is one example of a non-trivial processing system in which schedulers play a vital role. HBAs are well-known peripheral devices that handle data input/output (I/O) operations for host devices and systems (e.g., servers). A HBA provides I/O processing and physical connectivity between a host device and external data storage devices. The storage may be connected using a variety of known "direct attached" or storage networking protocols, including but not limited to fibre channel (FC), internet Small Computer System Interface (iSCSI), Serial Attached SCSI (SAS) and Serial ATA (SATA). HBAs provide critical server central processing unit (CPU) off-load, freeing servers to perform application processing. HBAs also provide a critical link between storage area networks (SANs) and the operating system and application software residing within the server. In this role, the HBA enables a range of high-availability and storage management capabilities, including load balancing, SAN administration, and storage management.

FIG. 1 illustrates an exemplary block diagram of a conventional host system 100 including a HBA 102. The host system 100 includes a conventional host server 104 that executes application programs 106 in accordance with an operating system program 108. The server 104 also includes necessary driver software 110 for communicating with peripheral devices. The server 104 further includes conventional hardware components 112 such as a CPU and host memory such as read-only memory (ROM), hard disk storage, random access memory (RAM), cache and the like, which are well known in the art. The server 104 communicates via a host bus (such as a peripheral component interconnect (PCI or PCIX) bus) 114 with the HBA 102, which handles the I/O operations for transmitting and receiving data to and from remote storage devices 116 via a storage area network (SAN) 118.

In order to further meet the increasing demands of I/O processing applications, multi-processor HBA architectures have been developed to provide multi-channel and/or parallel processing capability, thereby increasing the processing power and speed of HBAs. These multiple processors may be located within the controller chip. FIG. 2 illustrates an exemplary block diagram of a HBA 200 including a multi-processor interface controller chip 202. The interface controller chip 202 controls the transfer of data between devices connected to a host bus 204 and one or more storage devices in one or more SANs. In the example embodiment illustrated in FIG. 2, the controller chip 202 supports up to two channels A and B, and is divided into three general areas, one area 232 for channel A specific logic, another area 206 for channel B specific logic, and a third area 208 for logic common to both channels.

Each channel on the controller chip 202 includes a serializer/deserializer (SerDes) 210 and a protocol core engine (PCENG) 212 coupled to the SerDes 210. Each SerDes 210 provides a port or link 214 to a storage area network. These links may be connected to the same or different storage area networks. The PCENG 212 may be specific to a particular protocol (e.g., FC), and is controlled by a processor 216, which is coupled to tightly coupled memory (TCM) 218 and cache 220. Interface circuitry 222 specific to each channel and interface circuitry common to both channels 224 couples the processor 216 to the host (e.g. PCI/PCIX) bus 204 and to devices external to the controller chip 202 such as flash memory 226 or quad data rate (QDR) SRAM 228.

When data is transferred from a device on the host bus 204 to a storage device on the link 214, the data is first placed in the QDR SRAM 228 under the control of the processor 216 that controls the link. Next, the data is transferred from the QDR SRAM 228 to the link 214 via the common interface circuitry 224 and channel-specific interface circuitry 222, PCENG 212 and SerDes 210 under the control of the processor 216. Similarly, when data is transferred from the link to the device on the host bus 204, the data is first transferred into the QDR SRAM 228 before being transferred to the device on the host bus.

Messages and tasks. A HBA receives messages to be communicated between devices connected to the host bus and devices in the SAN, and messages destined for elements within the HBA. The messages are processed by one or more tasks within the HBA. For example, the HBA may receive control commands from a device on the host bus, translate the commands into control messages, and process the control messages within the HBA to perform a particular function. In another example, the host interface may receive data commands from a device on the host bus, translate the commands into data messages, and send these data messages to an I/O interface such as one of the PCENGs for further transmission to an external target.

A message is therefore a generic construct, an encapsulator for transport through the system. A message is a communication mechanism that can communicate a state, data, an indication of an event, or information to be passed between one or more tasks. Messages are meaningful to the HIBA architecture because they can modify the system state.

FIG. 3 is an exemplary task flow diagram presented for purposes of illustration only. In the task flow diagram of FIG. 3, a message 300 may initially be placed in a Port Queue 302, such as one found in a HBA. A Proto Router 304 reads the message from the Port Queue 302 and sends the message either to the SAS Cmd Queue 306 or the SMP Cmd Queue 308.

Two additional tasks consume messages from the SAS or SMP Cmd Queues 306 and 308, the SAS Handler 310 and SMP Handler 312, respectively. Once the appropriate task is executed, the results are placed in the Phy Queue 314, which is then read by the Phy Layer task 316.

Note that FIG. 3 could have been serialized to employ one SAS/SMP Cmd Queue and one SAS/SMP Handler, but by splitting the processing into two parallel paths, rules or priorities can be applied differently to the task in each path. In the example of FIG. 3, the SAS Handler task 310 is the higher priority task (indicated by priority path 318), and the SMP Handler task 312 is the lower priority task. In other words, in the example of FIG. 3, SAS messages have a higher priority than SMP messages. By assigning priorities, SAS messages placed in the Port Queue 302 will be sent to the SAS Cmd Queue 306 and then to the Phy Queue. 314 and then to the Phy Layer 316 ahead of SMP messages, while SMP messages having a lower priority will be processed when appropriate.

As is evident in FIG. 3, the Proto Router task 304 requires that a message have been placed in the Port Queue 302 before it can execute. The Proto Router task 304 also requires that space be available in the SAS Cmd Queue 306 and the SMP Cmd Queue 308 to be schedulable. Note that both the SAS Cmd Queue 306 and the SMP Cmd Queue 308 must be available in order to ensure that the processed message can be sent downstream regardless of the protocol of the message.

Scheduling of tasks. FIG. 3 illustrates that the processing of a message may involve the execution of multiple tasks. The purpose of a scheduler is to identify the next task to launch or dispatch from a list of other potentially dispatchable tasks, because not all tasks are immediately schedulable. For example, if a task required the presence of a message in a message queue, the task would be blocked until a message-appeared in the message queue.

Several conventional scheduling algorithms are known in the art. In preemptive scheduling, tasks can, be preempted to allow other tasks to run when a higher priority task is released by an interrupt raised due to a system event. This preemption is called a context switch, as the context for the current task must be saved off and the context of a new task migrated into the processor. Preemption ensures that the highest priority task is always executing. However, the penalty is increased overhead and a loss of efficiency created by the context switching.

Most conventional schedulers look at the resources needed by a task in a one-dimensional manner. If there are multiple tasks ready to run, the scheduler uses a policy to determine the order in which tasks are dispatched. Typically, the order is determined according to a priority scheme, but conventional priority schemes do not take into account all the resources that are required for a task to run to completion. Because conventional schedulers do not account for all the resources that a task may need to fully execute, a dispatched task becomes blocked when a required resource is unavailable. Once blocked, the task must revert to a "pending state" and give up the processor which it had-been granted. Note that the task is not reset, it is just paused (having yielded the CPU) and waiting for the resource to become available. When a task becomes blocked, the scheduler must run again and dispatch another task that is in a "ready queue" of other potentially dispatchable tasks. Note that tasks that appear to require no other resources except the processor to run are known as being in the "ready state" and are placed in the ready queue. However, even the newly dispatched task may become blocked, because tasks in the ready state may eventually need a resource that is not available. Eventually, the first blocked task may become unblocked when the required resource becomes available. For example, one of the tasks that was dispatched while the first task was in the pending state may have created the resource needed by the first task.

Because conventional schedulers do not take into account the additional dimension of the effect of resources other than the CPU resource, programmers must write application code to ensure that resources are available prior to the dispatch of a task, or accept the overhead of intermediate blocking and associated context switches—degrading throughput.

Another conventional scheduling method is task-level polling. Task-level polling is a mechanism whereby tasks are scheduled for execution and attempt to do as much work as possible in a state-machine architecture. If resources aren't available for the task, the task is rescheduled and tried again later. A disadvantage in this architecture is that polling wastes time (CPU resources) that could be used in more productive work.

Thus, a need exists for a scheduler that eliminates intermediate blocking between releases and reduces or removes task-level polling altogether. Removing the possibility of blocking means that common issues such as priority inversion will not occur, leading to better system performance.

SUMMARY OF THE INVENTION

A prerequisite-based scheduler according to embodiments of the present invention takes into account not only priority and resource blocking, but also prerequisites for execution to remove task-level polling. The fundamental idea behind the prerequisite based scheduler is that tasks are only scheduled when they can successfully run to completion. This implies that all necessary resources are available to the task prior to its execution and that the task, once dispatched, is guaranteed not to become blocked. The prerequisite-based scheduler is formed from a few simple ideas: (1) a system state identifies the state of the entire system; (2) tasks specify their prerequisites for execution; and (3) tasks are guaranteed not to block (they are dispatched only when all prerequisites are met).

The prerequisite based scheduler greatly reduces context switching because it is guaranteed not to have blocking by design. The prerequisite based scheduler performs a precheck before dispatching to make sure that the task not only has the processor but other required resources such as messages, buffers, any other conditions necessary to enable the task to run to completion.

Prerequisite tables are an essential part of the prerequisite based scheduler. In a prerequisite table, tasks are identified horizontally (i.e. each row represents a different task), and resources needed for the tasks are identified vertically (i.e. each column represents a different resource). The prerequisite table, when filled in, defines the prerequisites for each task that are required for the task to run to completion. At the bottom of the table is the system state, which represents the current state of all resources in the system. If a Boolean AND operation is applied to the task prerequisite row and the system state, and if the result is the same as the prerequisite row, then the task is dispatchable. In other words, if a comparison of a task's prerequisites (as defined by a task prerequisite row) with the resources currently available (as indicated by the system state) reveals that all of the resources needed by that task are currently available, then the task is considered dispatchable.

A side-effect of embodiments of the present invention is that no resource locking or checking is required within an application. In conventional schedulers, a resource is allocated and then error status checked to ensure that the resource was actually returned. In the present invention, all resources are available to a task upon dispatch, and therefore no resource checking is required, leading to more efficient operation.

In one embodiment of the present invention, the prerequisite based scheduler (dispatcher) walks through the prerequisite table from top to bottom until a task is found whose prerequisites are satisfied by the system state. Once found, this task is dispatched.

Once the dispatched task executes, the system state is updated to reflect the new status of the resources, and a comparison of another task in the prerequisite table is made to determine if this next task is schedulable. However, the order in which task prerequisite row comparisons are made is dependent on the policies employed by the prerequisite based scheduler. For example, the prerequisite based scheduler may be programmed according to a particular scheduling policy to either resume with the next task in order (fair-share scheduling), or start over at the top of the table (priority scheduling).

BRIEF DESCRIPTION OF THE DRAWINGS

FIG. 6 is an exemplary task table illustrating block priorities according to embodiments of the present invention.

FIG. 7 is an exemplary block diagram illustrating the storing of the last word column in an optimization of embodiments of the present invention.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should also be noted that although the present invention is primarily described herein in terms of HBAs for purposes of illustration and discussion only, embodiments of the present invention are applicable to other non-trivial processing systems where tasks must be scheduled.

The purpose of a scheduler is to identify the next task to execute from a list of other potentially dispatchable tasks. The scheduling decision can be made based upon task priority and/or the presence of a resource on which the task was previously blocked. For example, if a task were awaiting a message on a message queue, the task would be blocked until a message appeared.

Prerequisite-based scheduler. A prerequisite-based scheduler according to embodiments of the present invention takes into account not only priority and resource blocking, but also prerequisites for execution to remove task-level polling. The fundamental idea behind the prerequisite based scheduler is that tasks are only scheduled when they can successfully run to completion. This implies that all necessary resources are available to the task prior to its execution and that the task, once dispatched, is guaranteed not to become blocked. The prerequisite-based scheduler of the present invention is formed from a few simple ideas: (1) a system state identifies the-state of the entire system; (2) tasks specify their prerequisites for execution; and (3) tasks are guaranteed not to block (they are dispatched only when all prerequisites are met).

Embodiments of the present invention greatly reduce context switching because the present invention is guaranteed not to have blocking by design. The prerequisite based scheduler of the present invention does a pre-check before dispatching to make sure that the task not only has the processor but other required resources such as messages, buffers, any other conditions necessary to enable the task to run to completion.

Figure 3:
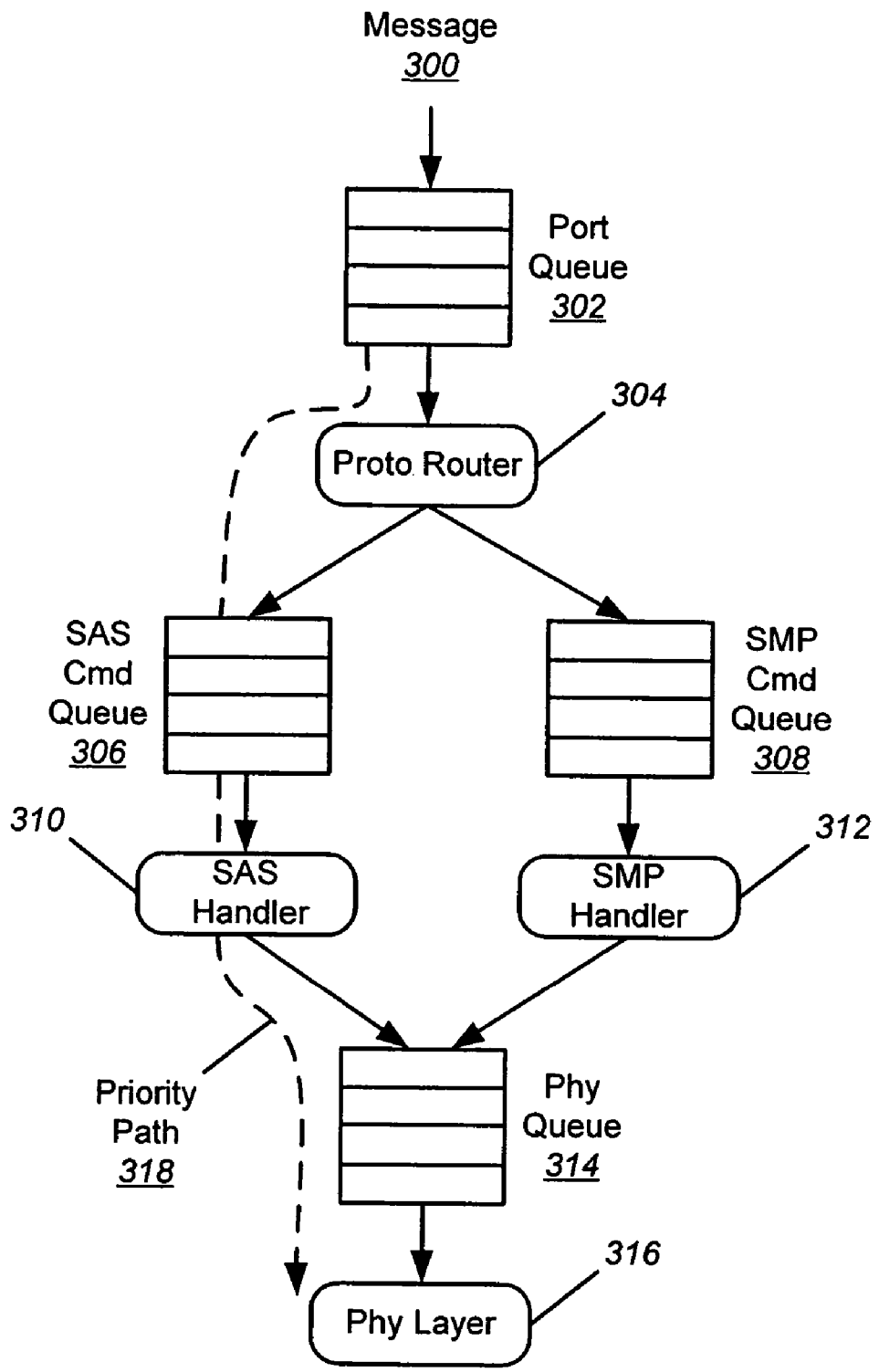
FIG. 3 is an exemplary task diagram showing tasks and resources needed by those tasks.

Referring again to the exemplary task flow diagram of FIG. 3, four tasks and four message queues and shown. Messages originate in the Port Queue 302 and are processed by the Proto Router task 304. Based upon message type, the processed message is loaded into either the SAS Cmd Queue 306 or the SMP Cmd Queue 308. The SAS Cmd Queue 306 is processed by the SAS Handler task 310, while the SMP Cmd Queue 308 is processed by the SMP Handler task 312. In both cases, these tasks process the messages and then load them onto the Phy Queue 314 which is then processed by the Phy Layer task 316. In the example of FIG. 3, the highest priority path 318 has been identified as the processing of SAS commands.

Using the Proto Router task 304 as an example task for purposes of illustration, the Proto Router task 304 reads messages from the Port Queue 302 and writes to either the SAS Cmd Queue 306 or the SMP Cmd Queue 308. From a prerequisite perspective, the Proto Router task 304 can only be executed if a message exists in the Port Queue 302 for it to process. Further, the Proto Router task 304 should not execute if space is not available in either the SAS Cmd Queue 306 or the SMP Cmd Queue 308. Therefore, the execution prerequisites for the Proto Router task 304 can be formally identified as:

Port Queue 302 must not be empty;
SAS Cmd Queue 306 must not be full; and
SMP Cmd Queue 308 must not be full.

From this perspective, if these prerequisites (or constraints) are satisfied, then the Proto Router task 304 can execute to completion once dispatched. This removes all task-level polling that would otherwise be required.

Note that the execution prerequisites for the other tasks in FIG. 3 can also be formally identified in the manner described above.

Figures 4, 5:
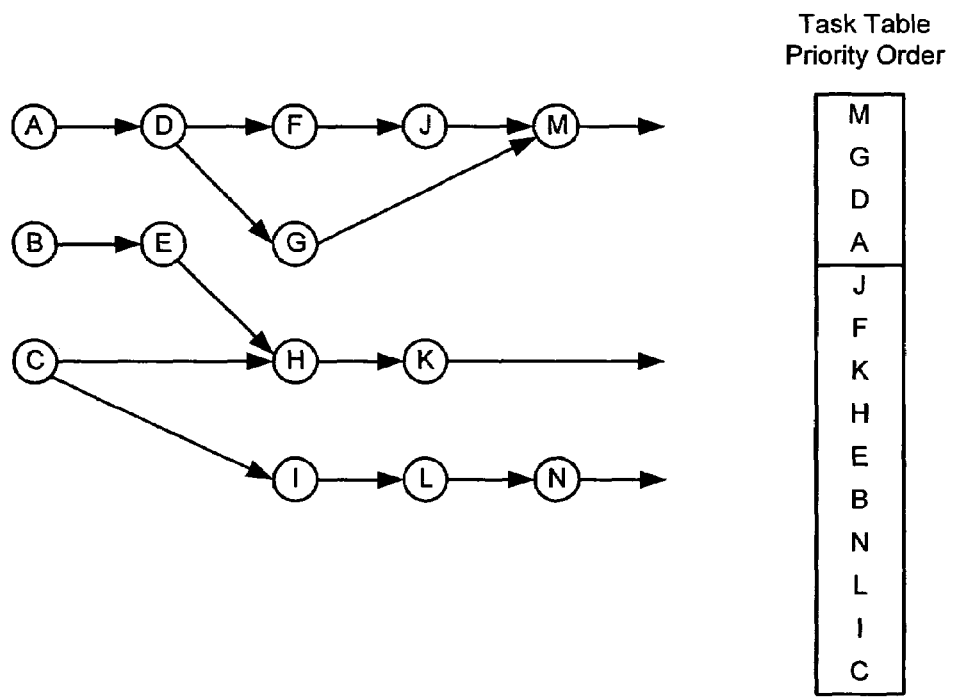
FIG. 4 is an exemplary prerequisite table according to embodiments of the present invention.
FIG. 5 is an exemplary task graph with a fast path indicated according to embodiments of the present invention.

Prerequisite table and system state. FIG. 4 is an exemplary prerequisite table 400 according to embodiments of the present invention. In the prerequisite table, tasks are identified horizontally (i.e. each row represents a different task), and resources needed for the tasks are identified vertically (i.e. each column represents a different resource). The prerequisite table 400, when filled in, defines the prerequisites for each task that are required for the task to run to completion. At the bottom of the table is the system state 402, which represents the current state of all resources in the system. If a Boolean AND operation is applied to the task prerequisite row of a particular task and the system state 402, and if the result is the same as the prerequisite row, then the task is dispatchable. In other words, if a comparison of a task's prerequisites (as defined by a task prerequisite row) with the resources currently available (as indicated by the system state 402) reveals that all of the resources needed by that task are currently available, then the task is considered dispatchable.

A side-effect of embodiments of the present invention is that no resource locking or checking is required within an application. In conventional schedulers, a resource is allocated and then error status checked to ensure that the resource was actually returned. In the present invention, all resources are available to a task upon dispatch, and therefore no resource checking is required, leading to more efficient operation.

It should be noted that in FIG. 4, two flags are assigned to define the Port Queue resource, !Full (a "not full" indicator) and !Empty (a "not empty" indicator). Using the Proto Router task as an example task for purposes of illustration, in the Proto Router row, the Port Queue !empty flag is set to 1, indicating that the Proto Router task requires that the Port Queue be not empty. Because the Proto Router task doesn't care whether the Port Queue is full or not, the Port Queue !full flag is set to 0, which is the "don't care" state for the prerequisite table 400. Similarly, because the Proto Router task requires that the SAS Cmd Queue be not full, the SAS Cmd Queue !Full flag is set to 1, while the SAS Cmd Queue !Empty flag is set to 0. In addition because the Proto Router task requires that the SMP Cmd Queue be not full, the SMP Cmd Queue !Full flag is set to 1, while the SMP Cmd Queue !Empty flag is set to 0. Furthermore, because the Proto Router task doesn't care about the state of the Phy Queue, the Phy Queue !Full and !Empty flags are both set to 0.

In the example of FIG. 4, the system state 402 indicates that the Port Queue !Full flag is set to 1 and the !Empty Flag is set to 0. Note that a 0 represents "false" in the system state 402 (as compared to representing a "don't care" in the prerequisite table 400). Thus, the system state Port Queue flags indicate that the Port Queue is not full and is in fact empty. Likewise, the SAS Cmd Queue !Full flag is set to 1 and the !Empty Flag is set to 1, indicating that the SAS Cmd Queue is not full and also not empty (contains one or more messages, but less than the total capacity). The SMP Cmd Queue !Full flag is set to 1 and the !Empty Flag is set to 0, indicating that the SMP Cmd Queue is empty. The Phy Queue !Full flag is set to 1 and the !Empty Flag is set to 0, indicating that the Phy Queue is empty.

When a Boolean AND operation is applied to the Proto Router prerequisite row and the system state 402, it is evident that the result is 00101000, which does not match the Proto Router prerequisite row, and therefore the Proto Router task is not schedulable at this time.

Scheduler algorithm. In one embodiment of the present invention, the prerequisite based scheduler (dispatcher) walks through the tasks from top to bottom until a task is found whose prerequisites are satisfied by the system state 402. Once found, this task is dispatched. In the example of FIG. 4, because Proto Router task prerequisites are not satisfied by the system state 402, the dispatcher moves to the next task. When the SAS Handler task prerequisite row is Boolean ANDed to the system state 402, the result is 00010010, which matches the SAS Handler prerequisite row, and therefore the SAS Handler task is permitted to execute.

Once the SAS Handler task executes and a message is placed in the Phy Queue (see FIG. 3), assuming no new message enters the Port Queue, the system state 402 would be updated to reflect that the Phy Queue now contains a message (i.e. the Phy Queue flags would be changed to !Full=1 and !Empty=1). With the system state 402 now updated, if the Phy Layer prerequisite row is compared to the updated system state 402, the comparison would result in a determination that the Phy Layer task would be schedulable, and therefore the Phy Layer task would be dispatched. However, the order in which task prerequisite row comparisons are made is dependent on the policies employed by the prerequisite based scheduler. The prerequisite based scheduler may be programmed according to a particular scheduling policy to either resume with the next task in order (fair-share scheduling), or start over at the top of the table (priority scheduling).

Note also that the system state 402 is also automatically updated whenever a message is applied to a message queue (e.g. message 300 applied to Port Queue 302 in FIG. 3). In general, the system state 402 is updated whenever the system is changed. The prerequisite table 400 and the system state 402 are significant because of the information they contain; the tasks, resources, the resources that each task needs to run, the tasks that are dependent on a particular resource, and the system state.

In one embodiment of the present invention, the order of the tasks in the prerequisite table 400 is according to an established priority, which may be chosen to maximize throughput (priority scheduling, resulting in pushing messages through the system). In FIG. 4, the order of tasks is arranged according to the priority path 318 of FIG. 3, and therefore the task order is Proto Router, SAS Handler and Phy Layer, followed by the SMP Handler. Note that FIG. 4 lists a task called the Idle Task which is scheduled only if nothing else in the system is schedulable.

A task is a template, and thus it can be present in the prerequisite table multiple times. For example, the PCENG of FIG. 2 may have multiple instantiations representing different interfaces, so the PCENG task would appear different times in the prerequisite table. When a particular one of these tasks is dispatched, it is dispatched with a context pointer, which provides the personality to the task, so that when it executes, it operates differently because it is specific to a particular interface.

As described above, prerequisite based schedulers according to embodiments of the present invention do not dispatch a task until all of the resources required by the task are schedulable. While this reduces the overhead created by context switching, among other things, it also means that tasks are dispatched less often. Prerequisite-based schedulers may be less desirable in real-time systems where it is desirable to obtain constant feedback to ensure that all of the services are making progress. In other words, in real-time systems where latencies must be controlled and deadlines must be met, and where partial progress is useful or desirable, conventional schedulers may be preferable. However, in applications where the goal is to consume and produce resources as efficiently as possible to move data through the system and maximize aggregate system throughput, prerequisite-based schedulers are generally more efficient.

In an alternative embodiment of the present invention, decision tree scheduling may be employed. Decision tree scheduling maintains the priority of the prerequisite table while translating the prerequisite table into a tree in which nodes represent resources, edges represent values for the resources (one or zero), and leaves represent tasks that are executed if the system state allows the tree to be traversed to a particular leaf. The decision tree is then traversed in accordance with the resources available at the time. Any leaf that is not filled will be automatically defined for the idle task (i.e., no known task can be scheduled given the current system state). This approach should required on average fewer compares that a scan of the prerequisite table, but generally requires more memory due to storage of the tree and its associated pointers. Decision tree scheduling cam be implemented using a simple binary tree, or the binary tree can be used to build a language-based decision tree using if-then-else constructs. The decision tree can be generated automatically using any of a number of tree induction algorithms well-understood by those skilled in the art.

Figures 8A, 8B:
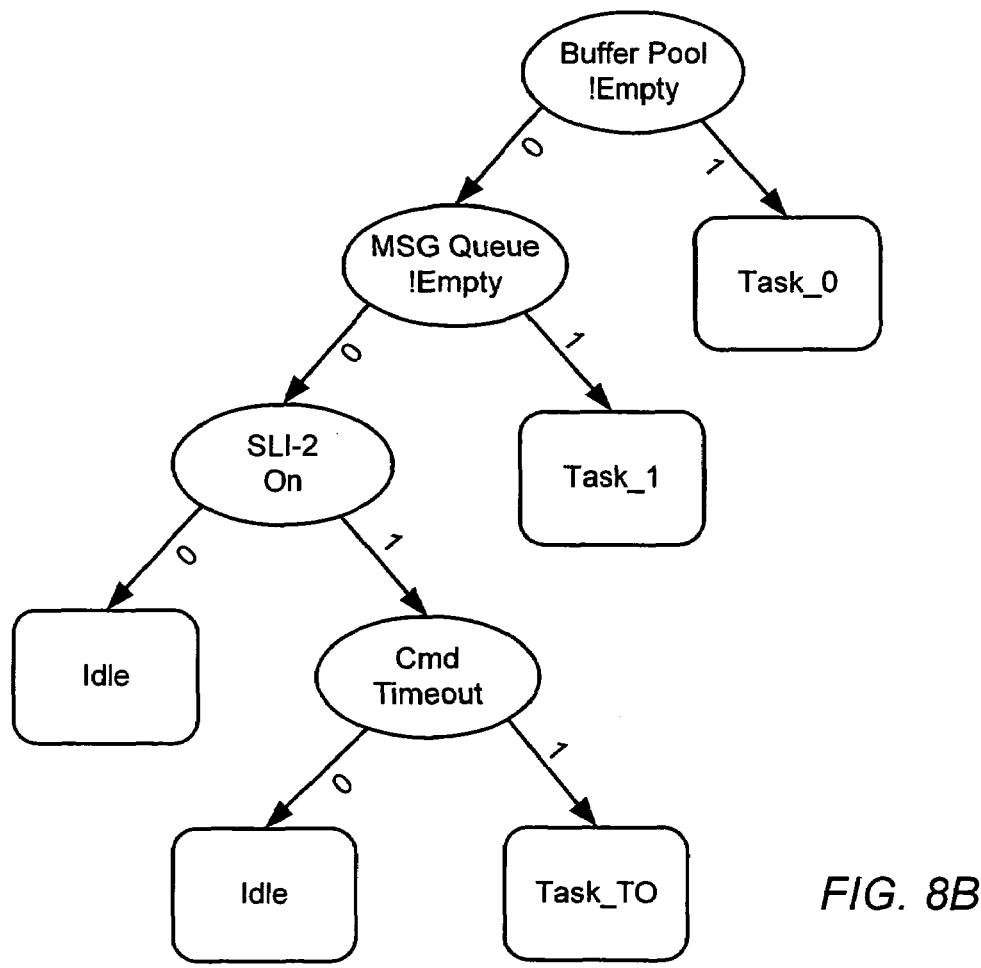
FIG. 8a is an examplary prerequisite table according to embodiments of the present invention.
FIG. 8b is an exemplary decision tree built from the example of FIG. 8a according to embodiments of the present invention.

FIG. 8a is an example prerequisite table according to embodiments of the present invention, and FIG. 8b is the decision tree built from the example of FIG. 8a. In FIG. 8b, the decision tree is traversed in accordance with the resources available at the time.

Modeling elements and implementation. The prerequisite based scheduler according to embodiments of the present invention lends itself well to modeling and code generation. The prerequisite table can be generated based upon tasking models that identify what a task requires for execution (presumably generated from a database). With task information in this centralized form, consistency checking of a system (how information flows, to whom, from where, the priority of the path, and the like) may be performed. The model can identify tasks that are undispatchable (prerequisites are never fulfilled), resources that are never used, and the like.

Figure 1:
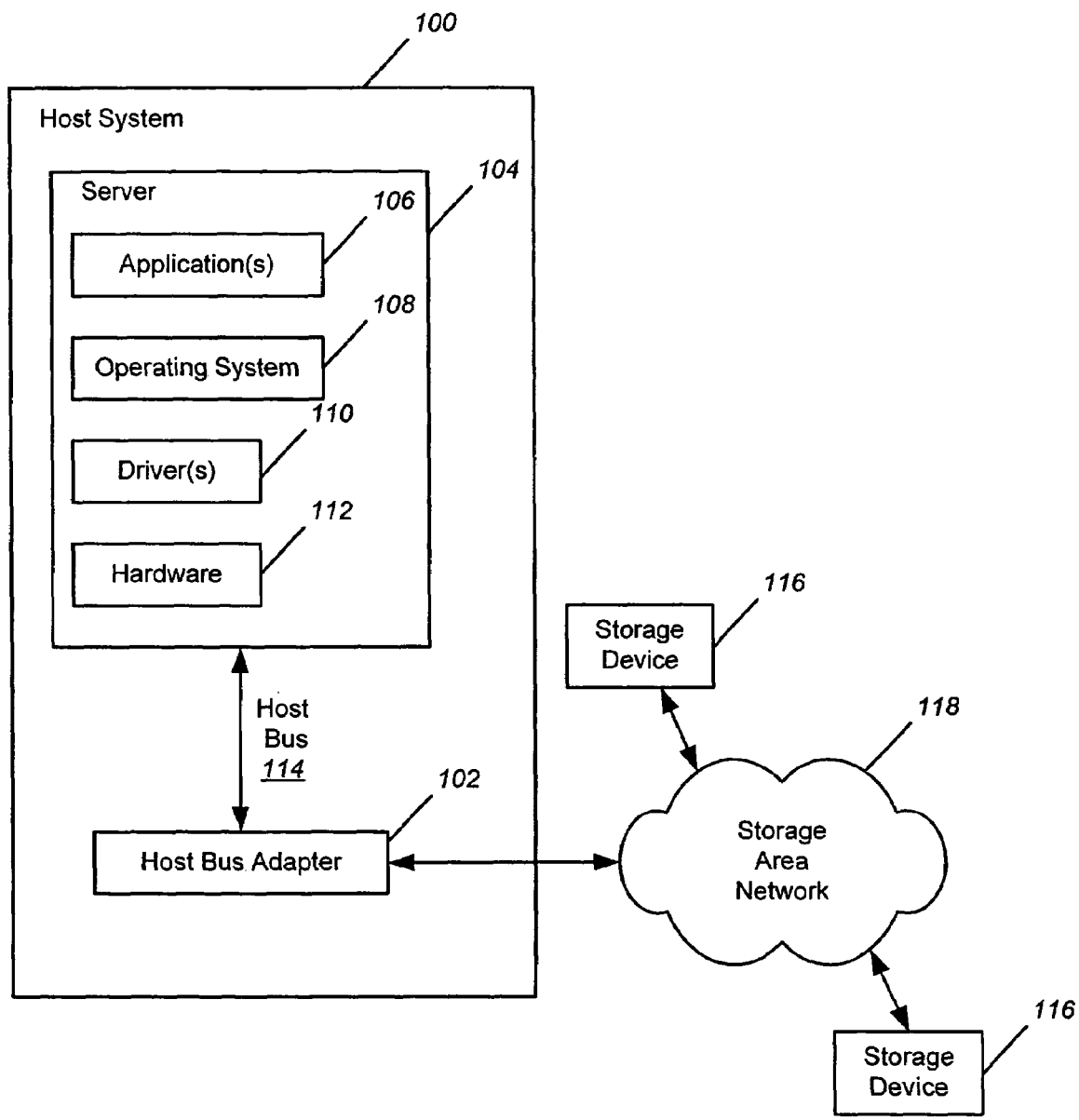
FIG. 1 illustrates an exemplary block diagram of a conventional host system including a HBA.
Figure 2:
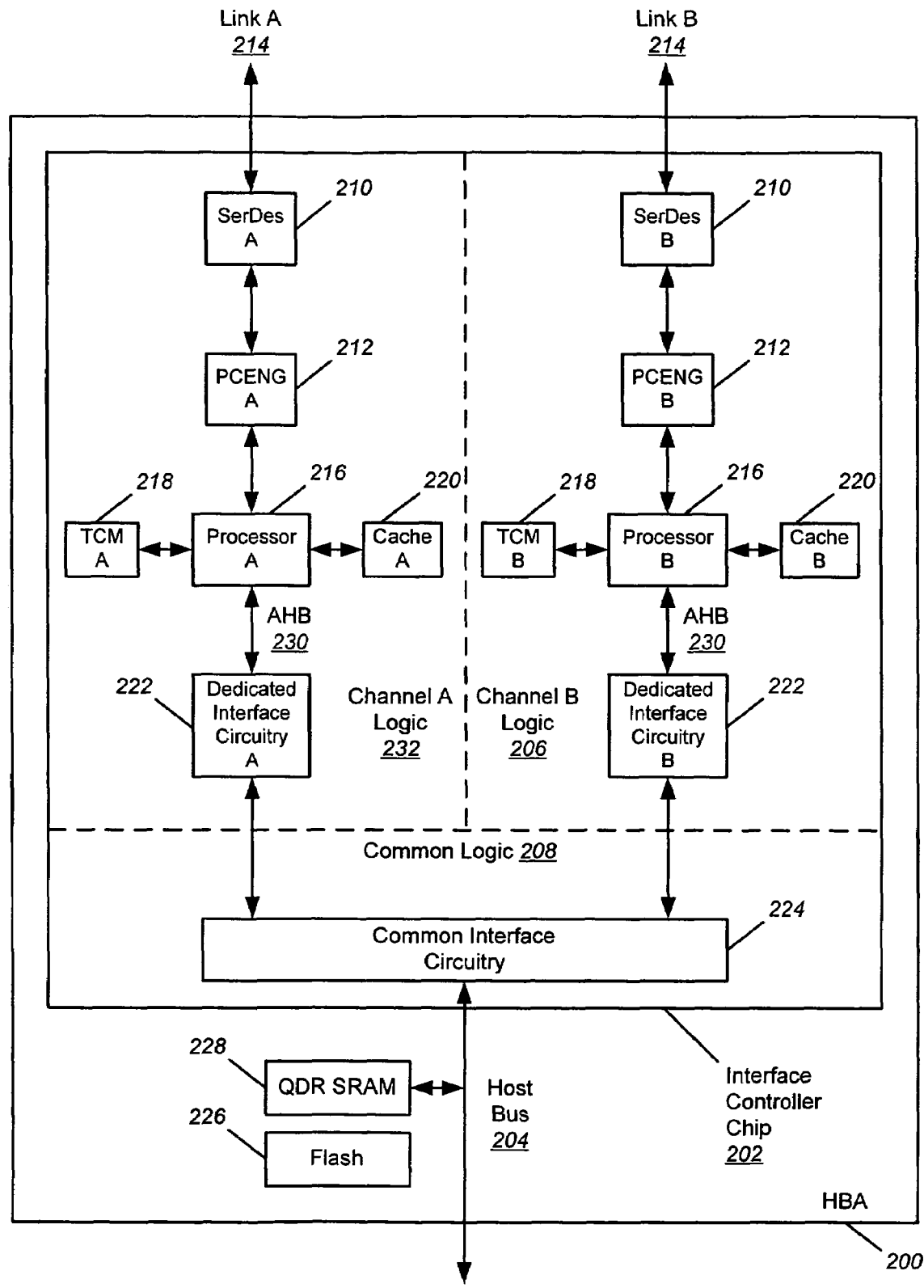
FIG. 2 illustrates an exemplary block diagram of a HBA including a multi-processor interface controller chip.

Embodiments of the present invention may be implemented in firmware and executed by one or more processors, such as those illustrated in FIG. 2. In a preferred embodiment, the prerequisite based scheduler would be embodied in the instruction cache of a processor. The footprint of the prerequisite based scheduler and associated services can advantageously be made relatively small. For example, the prerequisite based scheduler, message queue application programming interface (API), buffer pool API, and flags API required may require on the order of 1500 processor instructions. Note that the present invention may also be implemented in hardware (including the associated services, such as message queues and buffer pools).

Resources. A task's prerequisite for execution is based upon resource states (encoded within the global system state). Two basic types of resources are provided, upon which other types of resources are built. The two basic resources are flags and message queues.

A flag is typically a single bit. Flags can be set or reset, and identify some type of knowledge in the system. For example, the flag "INT" can specify that an interrupt has fired. A task can change state using either the flagReset or flagSet method.

A message queue provides a queue into which messages can be enqueued and dequeued. As noted above, two types of states are available for message queues (using two flag bits), "not full" and "not-empty." These two states provide all the necessary information for a message queue. Knowing that the message queue is not-empty means that a task will be able to read from it. Knowing that the message queue is not-full means that a task will be able to write to it. Therefore, only two flag bits are required. Further, upon creation of a queue, high water and low water marks can be specified to identify how full or how empty a queue gets before setting the full or empty indicators.

From flags and message queues, other types of resources are available. From message queues, buffer pools can be built. A buffer pool is a pool of static-sized buffers that can be allocated from a queue (dequeue) or deallocated to a queue (enqueue). This results in a very efficient static-sized buffer allocator. Tasks allocate and de-allocate to the buffer pools. Buffer pools require two flags, one to specify that the buffer pool is not empty and one to specify that the buffer pool is not full. However, the semantics of buffer pool flags are different as compared to message queues. With message queues, tasks wait for messages to appear so the message can be read and processed. Message queues contain information. However, a buffer pool is just a container used for information, a temporary resource that is allocated for a specific purpose and then deallocated. A task can be dependent on a message queue for data, and can also be dependent on a buffer pool as a resource to which data is passed. As noted above, a buffer pool is built using a message queue. A message queue is initialized as empty and is available to store messages to be passed between two tasks. In contrast, a buffer pool is initialized as full, where every entry is an empty buffer that is allocated for something. A message queue is a producer/consumer-type resource. In other words, a producer entity must produce something and put it into the message queue so that a consumer entity can pull it out, typically in first-in-first out (FIFO) order. In contrast, a buffer pool is a serially reusable resource. A buffer can be obtained from the buffer pool, perhaps implemented with a queue, used by a task, and returned to the buffer pool. The same task or another task may subsequently reuse that buffer.

Although the previous discussion focused on flags, message queues, and buffer pools, other types of resources may be listed in the prerequisite table of the present invention. In one example, a resource could be created to provide synchronization between the multiple PCENGs of FIG. 2, such as a flag that allows one task to run only if another task has already been run. Such a flag can be added as another column in the prerequisite table. This type of resource is able to synchronize and determine the order in which tasks are launched, independent of the order of tasks in the prerequisite table. Resources can simple true/false predicates, as described above, or they can be complex logic that must be evaluated. For example, a queue can be represented by one or more flags indicating whether the queue is more than ¼ full, and this detail may be used in the scheduling decisions.

The general nature of this resource representation lends itself to the creation of meta-resources that represent the loading of a given subsystem within the larger system. This meta-resource can then be used to make scheduling decisions at a higher level than provided by the flag, queue, and buffer pool resources.

Another type of resource that may be used in a prerequisite table is a timer. For example, if a dispatched task does not produce a response (such as the placement of a processed message in a queue) within 10 ms (i.e. a timeout has occurred), it may be desirable to perform some other action. The timeout resource may be implemented as a flag in the prerequisite table. When a timeout is indicated, the context of the task is enqueued into a timeout queue. The presence of this context in the timeout queue enables a timeout handler task to be schedulable. When the timeout handler task is dispatched, it reads the context from the timeout queue and performs a timeout action such as, for example voiding the transaction or reporting an error to the host. For example, if the Proto Router waits for a certain amount of time for the Port Queue to be not empty, and is still not able to run, then a Proto Router timeout flag might be set, and the context of the Proto Router task may be enqueued into a timeout queue. Another task called a Proto Router timeout handler would see that the Proto Router timeout flag is set and that a message is present in the timeout queue, and is now schedulable, and once the Proto Router timeout handler task is dispatched, it would perform certain actions to handle the timeout.

Task Table Ordering. The prerequisite based scheduler architecture according to embodiments of the present invention provides a number of mechanisms by which the overall system can be tuned or optimized. One such mechanism is task table ordering. As the prerequisite based scheduler moves down through the prerequisite table and makes comparisons, many serial operations may be performed in order to find a schedulable task. By putting the highest priority tasks at the top of the table, the number of operations or checks needed to find a high priority schedulable task is reduced. As described above, in one embodiment of the present invention the task table can be ordered in priority order (first row is highest priority task, last is the lowest). By examining the system flow and throughput, the tasks may be placed in the order that provided the greatest throughput. In an alternative embodiment, the ordering may be automatically generated by first defining the highest priority task at the top of the system and the bottom task. Using constraints, the high-priority path could be identified using prerequisites (starting from the bottom, working back towards the top high-priority task).

In other embodiments of the present invention where real-time scheduling is considered (as opposed to scheduling for maximum throughput), it may be optimal to give highest priority to tasks which have the highest frequency of occurrence or release. The prerequisite table allows for this, because the tasks can be listed in order of descending frequency. In general, if a different policy is desired, the tasks can be loaded into the table in a different order. Software tools may be written to represent different policies and used to load the table in different orders. Embodiments of the present invention are generic enough to accommodate multiple policies.

Priority flags. To avoid the situation of having the highest priority tasks use all available cycles, embodiments of the present invention may utilize priority flags within the prerequisite table to provide fairness in scheduling. In such embodiments, multiple flags would be created representing the desired number of priorities. A task's prerequisite row would have dependencies upon these priority bits in accordance with that task's priority. The scheduler would then walk bits through the priority flags permitting tasks at the varying priority levels access to the CPU. By changing the priority bits, other tasks may be allowed to execute. A fairness order may be created, some tasks may be given a higher priority, and some tasks may be starved. Thus, although the order of the table may be fixed, the priority flags allow the table order to be superceded with another priority.

In another embodiment, tasks may be able to set flags indicating that the task has not yet run or that the task needs to run. These flags can be added as a resource predicate in a column to be checked as part of the dispatch decision. For example, in FIG. 3 the priority order as established by the priority path 318 is Proto Router 304, SAS Handler 310, and Phy Layer 316. Referring now to FIG. 4, another column called "High Priority Flag" could be added, and if the SAS Handler is to be dependent on this flag, a "1" may be placed in the SAS Handler prerequisite row in the High Priority Flag column. By resetting the High Priority Flag bit, the SAS Handler task can be made not schedulable, which allows for the SMP Handler task to be schedulable. For example, by periodically resetting the High Priority Flag bit, the highest priority task can be made not schedulable so that other lower priority tasks have a chance to be scheduled.

Optimizing Queue Depths and Buffer Pool Sizes. Another optimization technique according to embodiments of the present invention is the determination of queue depths and buffer pool sizes (which can determine when tasks stall and allow other tasks to run). Increased queue depth for an output queue means a task can execute more times before being disallowed to execute (due to a full queue). Varying the number of buffers in a buffer pool can also alter the system behavior, by allowing other tasks to execute which are not dependent upon a resource that has been depleted.

Referring now to the example of FIG. 3, all queues have a depth of four. If the number of elements in a queue is increased, the frequency that the queue becomes full is reduced, so that a task that depends on the queue not being full is schedulable more often. Alternatively, if the queue is smaller, then the queue will be full more often, thereby changing the schedulability of tasks that need the queue to be not full. Thus, by changing the size of the buffer pools and queues, the behavior of the system can be altered. The changes to queue depths could be performed statically or dynamically.

Code Minimization. In some conventional schedulers, all tasks are built as state machines, and tasks execute until a required resource is determined to be unavailable, at which time the task becomes blocked. When a task becomes blocked, the task modifies a state and puts itself on a resource notify list, and another task is dispatched. When the resource becomes available, the original task is again dispatched and resumes at the proper point. These actions constitute a context switch, which requires the execution of a considerable amount of code. To reduce the overhead penalty associated with context switching, embodiments of the present invention do not dispatch a task until all required resources are available. Because tasks are called only when their resources are available to them, there is no need for resource checking code within the task (e.g. "did I get a NULL pointer back?"), nor is there a need for wait-lists or notify-lists to communicate resource availability to tasks. All of the code needed to perform a context switch is eliminated, and therefore the amount (and the complexity) of the code is minimized.

In addition, the present invention is deterministic (predictable and analyzable), as compared to previous solutions having the potential for intermediate blocking and context switches, which were difficult to analyze for throughput. In the present invention, by analyzing the system state it is possible to know at all times what tasks are dispatchable, and which tasks are not.

Resource Utiliiation. The scheduler architecture of the present invention puts emphasis not only on the priorities of the tasks in a system, but also in the ordering of tasks (the prerequisite table is ordered in priority order). This permits a system to be defined with emphasis on a particular high priority path. With such a priority ordering, emphasis is applied to the tasks in the path and their utilization of resources.

FIG. 5 is an exemplary task graph with a fast path indicated according to embodiments of the present invention. In FIG. 5, a number of tasks exist (A-N) that communicate with other tasks (shown as directed arrows). The fast path in FIG. 5 starts with Task A and ends with Task M. The sample task table illustrates a technique to consume-before-produce, as the final consumer of data is highest in the list. An alternative is to reorder starting from A and ending with M, which provides a produce-before-consume scheduling strategy. In the example of FIG. 5, the fast path is shown as the highest priority in the table, guaranteeing that it will execute before the other paths (starting with Tasks B and C). For this reason, resources are available first to the A-M path, and only when work is not available to be performed will those resources be available to the secondary paths. Note also that in addition to resource predicates such as "not full" and "not empty," resources can be defined with more complex predicates such as "less than 80% full."

Scheduling Policy. In embodiments of the present invention, the policies of the prerequisite based scheduler can be altered without any change to the underlying system. For example, rather than dispatch a task and then restart the search at the beginning of the table, the index could proceed from the dispatched task downward, allowing all tasks to execute (if dispatchable).

Considering that tasks are typically involved in paths for communication through protocol processing, another embodiment of the present invention arranges sets of contiguous tasks in blocks to maximize their ability to move data through the system. Typically, the scheduler will scan the prerequisite table until a task is found whose prerequisites are met, and then dispatch this task. The next scan will then begin at the beginning of the table. FIG. 6 is an exemplary task table illustrating block priorities according to embodiments of the present invention. Using block priorities, when a task is found to dispatch, the scan does not begin at the beginning of the table, but at the next task within the given priority block. For example, if task K were dispatched, the scheduler would begin the scan at Task H. If no tasks were found dispatchable in the block (ending with Task B), the scan would then start at the beginning of the table. This scheduling policy provides the means to push data through the task-graph to minimize overall latency.

Task Table Limits. As described above, a series of bits represent the system state, and a series of bits represent the resource prerequisites for a given task (the prerequisite row). These bits are contained in the largest word used in the architecture, e.g. 32 bits. If, for example, 128 bits are required to represent the system state, then each system state will comprise four 32-bit words, and each prerequisite row will comprise four 32-bit words. In the prerequisite based scheduler of the present invention, the system state is logical ANDed with the prerequisite row for a given task, and if the result equals the prerequisite row of that task, then all the bits (prerequisites) needed for that task are satisfied. If the system state and prerequisite rows comprise four 32-bit words, as in the example discussed above, then four 32-bit compares may be needed for each of the tasks to determine if the task is schedulable.

If the bits representing the resources are arranged such that all dependencies (i.e. bits set to "1") for a given task are contained in the first 32-bit word, there is no point in testing the other words, because they will contain all zeros. To take advantage of that fact, in one embodiment of the present invention, the last word that has any dependencies is stored, so that no further comparisons will be made beyond this last word. In the example above, the last word having any dependencies is the first word, and therefore no unnecessary comparisons of the second, third and fourth words will be made. Note that this optimization is beneficial only in the case when the comparison of the first word is a match, and the next word would be ordinarily be compared except for the fact that the stored information indicates that none of the other words has any prerequisites, and therefore that no further comparisons are necessary.

FIG. 7 is an exemplary block diagram illustrating the storing of the last word column in an optimization of embodiments of the present invention. In FIG. 7, the limit field identifies the last word that contains any set prerequisite bits. Thus, for the first task in the prerequisite table, the limit is "0", because word Flags[0] is the last word that contains any set prerequisite bits. The other limits are also set accordingly.

The preceding discussion demonstrates that the order of the resources (the order of the columns in the prerequisite table) can make a difference in the efficiency of the prerequisite based scheduler of the present invention. In preferred embodiments, the most frequently occurring bits (i.e. the bits most often set) are placed in the first word to compare, to maximize the chance that of an early determination that a task is not schedulable.

In another embodiment of the present invention, once a word comparison reveals that a task is missing a resource and is therefore not schedulable, no further comparisons are made because none of these comparisons would change the outcome that the task is not schedulable.

Scope of task resources. In the previous discussion of the example of FIG. 3, it was noted that the Proto Router task required that a message be present in the Port Queue and that there was space available in the SAS Cmd Queue and the SMP Cmd Queue. Note that this analysis of task prerequisites was localized to resources directly needed by the task. However, the prerequisites for a task could have been determined more globally. For example, the task prerequisites of the Proto Router of FIG. 3 could have been broadened to include the requirement that space is available in the Phy Queue. This broadening of the scope of task prerequisites means that fewer tasks will be scheduled, but those that are scheduled will be able to make more progress. In the example described above, the broadened scope of task prerequisites will result in the immediate processing of the entire priority path 318 once the Proto Router task 304 is dispatched.

In an alternative to broadening the scope of task prerequisites, multiple prerequisite tables reflecting different scheduling policies may be available. Each table could have been previously analyzed and optimized for different policies and situations. These tables could be interchanged if performance is not meeting expectations.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for scheduling a plurality of tasks in a processing system having a plurality of defined resources, comprising:

identifying prerequisites for each task, the prerequisites representing all defined resources needed for that task to execute to completion;

identifying one or more higher priority task paths and one or more lower priority task paths, each of the paths having a plurality of tasks in series;

representing each defined resource by one or more resource flags that provide information about that resource;

storing the prerequisites for each task as a collection of resource flags known as a prerequisite row;

storing the system state as a collection of resource flags;

creating a prerequisite table, the prerequisite table having one prerequisite row for each instantiated task arranged in descending order according to a task priority order determined in accordance with the higher priority task paths and the lower priority task paths, and having one column for each resource flag;
in a descending row order, performing a comparison of the prerequisite row for the task in a given row against a system state representing a current state of the defined resources until a task is identified for which the comparison reveals that the prerequisites for the identified task are currently available; and
dispatching the identified task.

2. The method as recited in claim 1, further comprising:
arranging the task priority order such that the tasks in the priority task paths have a higher priority than other tasks.

3. The method as recited in claim 2, further comprising:
modifying a scope of the prerequisites for the tasks in a particular priority task path to adjust a processing speed of that priority task path.

4. The method as recited in claim 1, further comprising:
identifying one or more fast paths in a task processing sequence; and
for a given fast path, arranging the task priority order such that the tasks in the given fast path have a higher priority than other tasks.

5. The method as recited in claim 4, further comprising:
identifying a processing order of the tasks in the given fast path; and
arranging the task priority order such that a last task in the given fast path has a higher priority than a first task in the given fast path.

6. The method as recited in claim 4, further comprising:
identifying a processing order of the tasks in the given fast path; and
arranging the task priority order such that a first task in the given fast path has a higher priority than a last task in the given fast path.

7. The method as recited in claim 1, further comprising comparing the prerequisite row for the particular task against the system state by performing a Boolean AND of the prerequisite row and the system state.

8. The method as recited in claim 1, further comprising:
creating a decision tree from the prerequisite table according to the task priority order, the decision tree having one leaf for each instantiated task, one node for each resource, and one edge for each resource flag; and
traversing the decision tree in accordance with the availability of resources.

9. The method as recited in claim 1, further comprising updating the system state after resources are actually used.

10. The method as recited in claim 9, wherein after the system state has been updated, the method further comprises implementing fair-share scheduling by resuming the comparison of prerequisite rows against the updated system state at a next row in the prerequisite table.

11. The method as recited in claim 9, wherein once the system state has been updated, the method further comprises implementing priority scheduling by resuming the comparison of prerequisite rows against the updated system state at a first row in the prerequisite table.

12. The method as recited in claim 9, further comprising:
grouping consecutive prerequisite rows in the prerequisite table into one or more blocks;
when a task is identified and scheduled for dispatch, identifying the block to which the identified task belongs; and
once the identified task is dispatched and the system state is updated, resuming the comparison at a next row within the identified block, or resuming the comparison at a first row of the prerequisite table if the dispatched task was a last task in the identified block.

13. The method as recited in claim 1, further comprising:
creating one or more priority flags representing various priority levels as defined priority flag resources in the processing system; and
adding the priority flag resources to the prerequisites of selected tasks in accordance with priority levels desired for those tasks;
wherein the priority flag resources effectively change the task priority order as the prerequisites for the selected tasks are compared against the system state.

14. The method as recited in claim 1, the defined resources including one or more queues, the method further comprising:
changing a depth of one or more queues to alter the scheduling of tasks having those queues as prerequisites.

15. The method as recited in claim 1, the defined resources including one or more buffer pools, the method further comprising:
changing a depth of one or more buffer pools to alter the scheduling of tasks having those buffer pools as prerequisites.

16. The method as recited in claim 1, further comprising:
storing the prerequisite rows in M N-bit words, each bit in each N-bit word representing a resource flag and each resource flag being either asserted to indicate that the resource flag is a prerequisite of the task represented by the prerequisite row or deasserted to indicate that the resource flag is not a prerequisite of that task;
storing the system state in M N-bit words, each bit in each N-bit word representing a resource flag, each resource flag being either asserted or deasserted in accordance with the current state of the processing system;
storing an indicator of the last N-bit word containing an asserted resource flag;
comparing the prerequisites and the system state of successive N-bit words only up to the last N-bit word containing an asserted resource flag; and
determining whether the prerequisites for the identified task are currently available using only the compared N-bit words.

17. The method as recited in claim 16, further comprising:
arranging the resource flags that make up the prerequisite rows and the system state so that when the prerequisite rows are stored in the M-bit words, the number of asserted resource flags appearing in the first M-bit word is maximized.

18. The method as recited in claim 1, further comprising:
storing the prerequisite rows in M N-bit words, each bit in each N-bit word representing a resource flag, each resource flag being either asserted to indicate that the resource flag is a prerequisite of the task represented by the prerequisite row or deasserted to indicate that the resource flag is not a prerequisite of that task;
storing the system state in M N-bit words, each bit in each N-bit word representing a resource flag, each resource flag being either asserted or deasserted in accordance with the current state of the processing system;

comparing the prerequisites and the system state of successive N-bit words only as long as the comparison indicates that the prerequisites for the identified task are currently available.

19. In a processing system having a plurality of defined resources, the processing system for executing a plurality of tasks, a computer program for scheduling the plurality of tasks, the computer program being stored on a machine readable medium and executable to perform acts comprising:
   identifying prerequisites for each task, the prerequisites representing all defined resources needed for that task to execute to completion;
   identifying one or more higher priority task paths and one or more lower priority task paths, each of the paths having a plurality of tasks in series;
   representing each defined resource by one or more resource flags that provide information about that resource;
   storing the prerequisites for each task as a collection of resource flags known as a prerequisite row;
   storing the system state as a collection of resource flags;
   creating a prerequisite table, the prerequisite table having one prerequisite row for each instantiated task arranged in descending order according to a task priority order determined in accordance with the higher priority task paths and the lower priority task paths, and having one column for each resource flag;
   in a descending row order, performing a comparison of the prerequisite row for the task in a given row against a system state representing a current state of the defined resources until a task is identified for which the comparison reveals that the prerequisites for the identified task are currently available; and
   scheduling the identified task for dispatch.

20. The computer program as recited in claim 19, further executable to perform acts comprising:
   arranging the task priority order such that the tasks in the priority task paths have a higher priority than other tasks, 21. The computer program as recited in claim 20, further executable to perform acts comprising:
   modifying a scope of the prerequisites for the tasks in a particular priority task path to adjust a processing speed of that priority task path.

22. The computer program as recited in claim 19, further executable to perform acts comprising:
   identifying one or more fast paths in a task processing sequence; and
   for a given fast path, arranging the task priority order such that the tasks in the given fast path have a higher priority than other tasks.

23. The computer program as recited in claim 22, further executable to perform acts comprising:
   identifying a processing order of the tasks in the given fast path; and
   arranging the task priority order such that a last task in the given fast path has a higher priority than a first task in the given fast path.

24. The computer program as recited in claim 22, further executable to perform acts comprising:
   identifying a processing order of the tasks in the given fast path; and
   arranging the task priority order such that a first task in the given fast path has a higher priority than a last task in the given fast path.

25. The computer program as recited in claim 19, further executable to perform acts comprising comparing the prerequisite row for the particular task against the system state by performing a Boolean AND of the prerequisite row and the system state.

26. The computer program as recited in claim 19, further executable to perform acts comprising:
   creating a decision tree from the prerequisite table according to the task priority order, the decision tree having one leaf for each instantiated task, one node for each resource, and one edge for each resource flag; and
   traversing the decision tree in accordance with the availability of resources.

27. The computer program as recited in claim 19, further executable to perform acts comprising updating the system state as resources are actually used.

28. The computer program as recited in claim 27, wherein after the system state has been updated, the computer program is further executable to perform acts comprising fair-share scheduling by resuming the comparison of prerequisite rows against the updated system state at a next row in the prerequisite table.

29. The computer program as recited in claim 27, wherein once the system state has been updated, the computer program is further executable to perform acts comprising priority scheduling by resuming the comparison of prerequisite rows against the updated system state at a first row in the prerequisite table.

30. The computer program as recited in claim 27, further executable to perform acts comprising:
   grouping consecutive prerequisite rows in the prerequisite table into one or more blocks;
   when a task is identified and scheduled for dispatch, identifying the block to which the identified task belongs; and
   once the identified task is dispatched and the system state is updated, resuming the comparison at a next row within the identified block, or resuming the comparison at a first row of the prerequisite table if the dispatched task was a last task in the identified block.

31. The computer program as recited in claim 19, further executable to perform acts comprising:
   creating one or more priority flags representing various priority levels as defined priority flag resources in the processing system; and
   adding the priority flag resources to the prerequisites of selected tasks in accordance with priority levels desired for those tasks;
   wherein the priority flag resources effectively change the task priority order as the prerequisites for the selected tasks are compared against the system state.

32. The computer program as recited in claim 19, the defined resources including one or more queues, the computer program further executable to perform acts comprising:
   changing a depth of one or more queues to alter the scheduling of tasks having those queues as prerequisites.

33. The computer program as recited in claim 19, the defined resources including one or more buffer pools, the computer program further executable to perform acts comprising:
   changing a depth of one or more buffer pools to alter the scheduling of tasks having those buffer pools as prerequisites.

34. The computer program as recited in claim 19, further executable to perform acts comprising:

storing the prerequisite rows in M N-bit words, each bit in each N-bit word representing a resource flag and each resource flag being either asserted to indicate that the resource flag is a prerequisite of the task represented by the prerequisite row or deasserted to indicate that the resource flag is not a prerequisite of that task;

storing the system state in M N-bit words, each bit in each N-bit word representing a resource flag, each resource flag being either asserted or deasserted in accordance with the current state of the processing system;

storing an indicator of the last N-bit word containing an asserted resource flag;

comparing the prerequisites and the system state of successive N-bit words only up to the last N-bit word containing an asserted resource flag; and determining whether the prerequisites for the identified task are currently available using only the compared N-bit words.

35. The computer program as recited in claim 34, further executable to perform acts comprising:

arranging the resource flags that make up the prerequisite rows and the system state so that when the prerequisite rows are stored in the M-bit words, the number of asserted resource flags appearing in the first M-bit word is maximized.

36. The computer program as recited in claim 19, further executable to perform acts comprising:

storing the prerequisite rows in M N-bit words, each bit in each N-bit word representing a resource flag, each resource flag being either asserted to indicate that the resource flag is a prerequisite of the task represented by the prerequisite row or deasserted to indicate that the resource flag is not a prerequisite of that task;

storing the system state in M N-bit words, each bit in each N-bit word representing a resource flag, each resource flag being either asserted or deasserted in accordance with the current state of the processing system;

comparing the prerequisites and the system state of successive N-bit words only as long as the comparison indicates that the prerequisites for the identified task are currently available.

37. The computer program as recited in claim 19, wherein the machine readable medium on which the computer program is stored is included within a host bus adapter (HBA).

38. The computer program as recited in claim 37, wherein the HBA further comprises an Internet Small Computer System Interface (iSCSI) or fibre channel (FC) controller circuit.

39. The computer program as recited in claim 38, wherein the HBA is included within a host computer.

40. The computer program as recited in claim 39, wherein the host computer is included within a storage area network (SAN) and wherein an iSCSI or a FC network is coupled to the iSCSI or FC controller circuit, respectively, and one or more storage devices are coupled to the iSCSI or FC network.

* * * * *